United States Patent
Ye et al.

(10) Patent No.: US 12,429,631 B2
(45) Date of Patent: Sep. 30, 2025

(54) METHOD FOR PRODUCING ANTI-REFLECTIVE TEXTURED SURFACE USING ADDITIVE THIN FILM

(71) Applicant: Thorlabs, Inc., Newton, NJ (US)

(72) Inventors: Longfei Ye, Columbia, SC (US); Ryan Joseph Priore, Wexford, PA (US); Bill Donovan, Montclair, NJ (US); Alex Cable, Newton, NJ (US)

(73) Assignee: Thorlabs, Inc., Newtown, NJ (US)

( * ) Notice: Subject to any disclaimer, the term of this patent is extended or adjusted under 35 U.S.C. 154(b) by 184 days.

(21) Appl. No.: 18/234,506

(22) Filed: Aug. 16, 2023

(65) Prior Publication Data

US 2024/0061152 A1    Feb. 22, 2024

Related U.S. Application Data

(60) Provisional application No. 63/398,357, filed on Aug. 16, 2022.

(51) Int. Cl.
  *B05D 3/14* (2006.01)
  *G02B 1/111* (2015.01)
  *G02B 1/118* (2015.01)

(52) U.S. Cl.
  CPC ............. *G02B 1/111* (2013.01); *B05D 3/148* (2013.01); *G02B 1/118* (2013.01)

(58) Field of Classification Search
  CPC ........... G02B 1/12; G02B 1/111; G02B 1/118; G02B 1/02
  See application file for complete search history.

(56) References Cited

U.S. PATENT DOCUMENTS

| 5,952,244 A * | 9/1999 | Abraham .......... H01L 21/32139 |
| | | 438/738 |
| 2015/0103396 A1 | 4/2015 | Zollars et al. |
| 2017/0123157 A1 | 5/2017 | L'Huillier et al. |
| 2018/0136370 A1 * | 5/2018 | Busse ........................ H01S 1/06 |
| 2022/0013369 A1 | 1/2022 | Tanibe et al. |
| 2022/0317338 A1 * | 10/2022 | Shi ........................... G02B 1/12 |

FOREIGN PATENT DOCUMENTS

WO    2020 155111 A1    8/2020

OTHER PUBLICATIONS

The extended European search report with search opinion issued by the European Patent Office for European Patent Application No. 23191588.5, dated Feb. 8, 2024.

* cited by examiner

*Primary Examiner* — Michael P Wieczorek
(74) *Attorney, Agent, or Firm* — Myers Wolin, LLC

(57) ABSTRACT

In a method of producing an anti-reflective surface, instead of etching subwavelength structures directly onto the substrate, a thin film layer of topcoat is deposited onto the surface of the substrate, and the anti-reflective surface is created by etching the structures into the topcoat. Because the thin film can be applied to substrates made of a large number of different materials, only common etching recipes need to be developed for a few thin film materials. The present method overcomes the shortcoming that existing methods of etching structures directly on a substrate would require a different etching recipe for each substrate made of a different material.

20 Claims, 3 Drawing Sheets

METHOD FOR PRODUCING ANTI-REFLECTIVE TEXTURED SURFACE USING ADDITIVE THIN FILM

CROSS REFERENCE TO RELATED APPLICATIONS

This application claims the benefit of U.S. Provisional Patent Application No. 63/398,357 filed on Aug. 16, 2022. The disclosure of U.S. Provisional Patent Application No. 63/398,357 is hereby incorporated by reference.

TECHNICAL FIELD

The present disclosure generally relates to optical elements, and more particularly to a method for producing anti-reflecting textured surface using an additive thin film.

BACKGROUND

When light strikes an interface between different optical media such as the surface of a substrate/optic, an optical reflection occurs. For many optical systems, such optical reflection creates problems, such as lost transmittance of wanted image fluxes, or unwanted presence of ghost images. Currently anti-reflecting (AR) coatings are typically fabricated by depositing thin films at high vacuum levels. However, traditional thin-film coatings have drawbacks/limitations including a narrow bandwidth (perform poorly outside the designated range due to these layers work based on destructive interference of light), a low laser damage threshold (due to the choice of material), a high angular sensitivity, adhesion problems due to temperature cycling, performance degradation/lifetime issues due to thermal cycling/harsh environments. These layers require precise control of the thickness to achieve the desired AR performance. The destructive interference that the thin-film method utilizes for AR limits the working wavelength range. The choice of film material can also lead to material absorption which can limit the working wavelength range of the device or also cause absorption which results in film failure. Therefore, it is necessary to have many materials and subsequent processes to satisfy the need to provide solutions across a wide wavelength range.

The reflected power can also be reduced by creating a textured interface at the surface of the substrate/optic. By gradually tapering the material to minimize the abrupt change of refractive index at the substrate/air interface, these "motheye" type structures have been demonstrated. However, motheye structures consist of a periodic array of nanoscale pillars, and the fabrication of motheye structures requires nanoscale masks to be premade on the substrate before making the structures on the substrate. This mask fabrication step usually requires a lithography process, which employs expensive capital expenditure equipment and personnel with high levels of training and experience. Furthermore, the periodic array of pillars produces undesirable diffraction effects at large/steep angles. For instance, for an array of pillars with a 200 nm space, the pillars diffract light with a 300 nm wavelength for a large angle of incidence such as 45° (although it doesn't do so for a small angle of incidence). The diffraction causes light losses.

Therefore, there is a long-felt need for a robust process to manufacture stable AR coatings with wide wavelength bands capable of withstanding high optical power, with low angular sensitivity, and weak polarization dependence. It is also desirable to have a process relatively independent of material or wavelength and capable of easily fabricating structures for different substrates.

SUMMARY

An embodiment of the present disclosure makes subwavelength structures providing anti-reflection effects that are superior to existing methods (traditional thin film technology): broader antireflection performance range, higher laser induced damage threshold, lower angular sensitivity, and weaker polarization dependence. Instead of etching subwavelength structures directly into the substrate surface, an embodiment of the present disclosure applies a thin film layer of topcoat onto the surface of the substrate and creates structures that are etched into the topcoat. An etching process is provided which removes materials that are underneath the plasma and simultaneously deposits polymer particles on the surface of substrate being etched. This unique etching process creates subwavelength structures that provide the desired antireflection performances. The size, height and spacing of the structures are varied to provide optimal optical performances for the intended wavelength range.

An embodiment of the present disclosure provides a method of producing an anti-reflective textured surface of an additive thin film deposited onto a substrate to increase transmission of light through the substrate, the method including: applying a thin film to a surface of the substrate; placing the coated substrate between a first and second electrodes of an etching chamber; injecting a mixture of gases into the etching chamber; applying a radio frequency wave to the electrodes to ionize the mixture of gases and create a plasma between the electrodes; wherein the plasma chemically and physically etches away material of the exposed thin film and simultaneously deposits nanoscale polymer islands on the thin film surface; wherein the deposited nanoscale polymer is configured to resist chemical etching by the plasma, which prevents the removal of material that is covered under the polymer; wherein energetic ions driven by the radio frequency wave on the electrodes physically remove the thin film and polymer materials; wherein the deposition and physical removal of the polymer concurrently occur on the thin film surface; wherein the chemical and physical etching continues for a length of time to produce textured structures that are distributed on the thin film surface, and the structures have varied sizes, heights, and spacings.

Another embodiment of the present disclosure provides a method of producing an anti-reflective textured surface of a substrate using a sacrificial thin film to increase transmission of light through the substrate, the method including: applying a thin film to a surface of the substrate; placing the substrate between a first and second electrodes of an etching chamber; injecting a first mixture of gases into the etching chamber; applying a first radio frequency wave to the electrodes to ionize the first mixture of gases and create a first plasma between the electrodes; wherein the first plasma chemically and physically etches away material of the exposed thin film and simultaneously deposits nanoscale polymer islands on the thin film surface; wherein the deposited nanoscale polymer is configured to resist chemical etching by the first plasma, which prevents the removal of material that is covered under the polymer; wherein energetic ions driven by the first radio frequency wave on the electrodes physically remove the thin film and polymer materials; wherein the deposition and physical removal of the polymer concurrently occur on the thin film surface;

wherein the chemical and physical etching continues for a first length of time to produce textured structures that are distributed on the thin film surface, and the structures have varied sizes, heights, and spacings; injecting a second mixture of gases into the etching chamber; applying a second radio frequency wave to the electrodes to ionize the second mixture of gases and create a second plasma between the electrodes; wherein the second plasma removes the thin film and substrate materials concurrently; wherein the structures made in the thin film material serve as masks for etching the substrate material; wherein the etching continues for a second length of time to transfer the textured structures from the thin film to the substrate.

DETAILED DESCRIPTION

Figure 1:
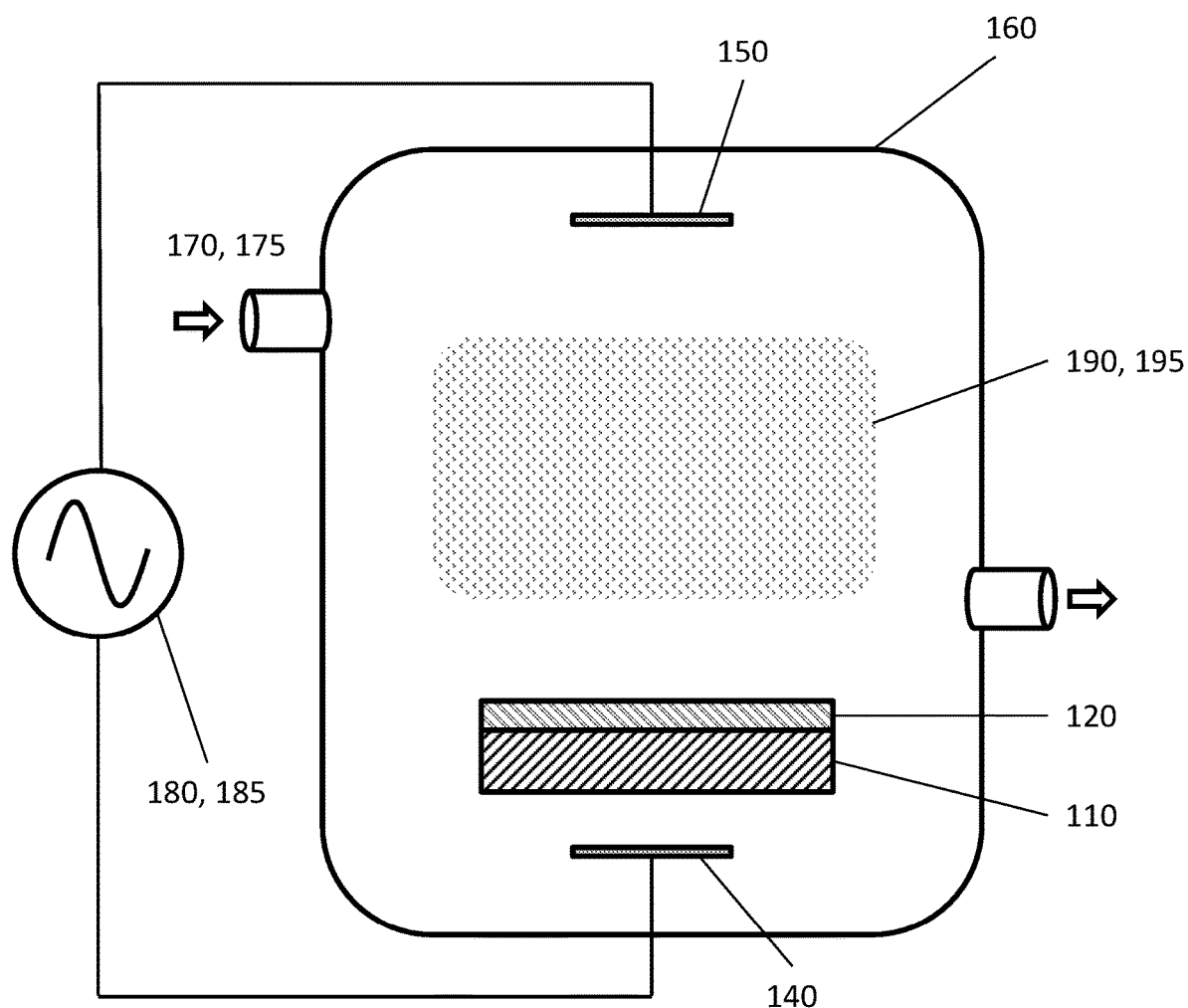
FIG. 1 illustrates a setup for producing an AR textured surface according to one embodiment of the present disclosure.

The description of illustrative embodiments according to principles of the present disclosure is intended to be read in connection with the accompanying drawings, which are to be considered part of the entire written description. In the description of embodiments of the disclosure herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example presented solely for illustrative purposes by reference to the accompanying drawings to advise one of ordinary skill in the art of the advantages and construction of the certain embodiments. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

FIG. 1 illustrates a schematic diagram of a system for fabricating an AR structure on the surface of a substrate according to an embodiment of the present disclosure.

Figure 2A:
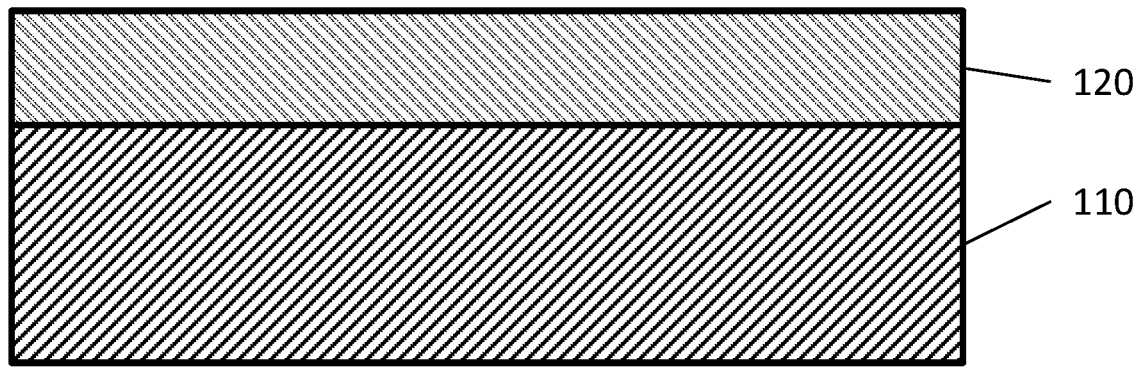
FIG. 2A illustrates a thin film deposited on a substrate.
Figure 2B:
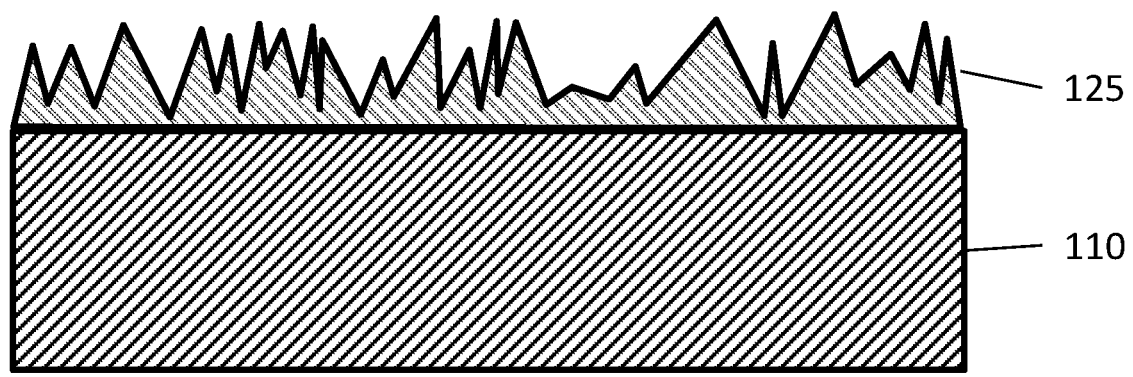
FIG. 2B illustrates the texture created in the thin film according to one embodiment of the present disclosure.

As shown in FIG. 2A, a thin film 120 is applied onto the substrate 110 in the initial state. In the present context, it is understood that a thin film is a two dimensional material layer deposited on a substrate in order to achieve AR properties, and the thickness of the thin film ranges from nanometers to micrometers. Depending on the specific need of the optical system, the thin film thickness is selected to allow for the modification of the size, height, and density of the textured structures. FIG. 2B shows the final state where the textured structures 125 is manufactured on the thin film.

The substrate can be made of a large variety of materials commonly used in optical systems. For example, the material for the substrate may be selected from any one or more of the following: borosilicate glass, barium borate, barium fluoride calcite, sapphire, calcium fluoride, diamond, indium fluoride, magnesium fluoride, potassium bromide, zinc selenide, germanium, polytetrafluoroethylene, rutile, yttrium orthovanadate, zirconium fluoride. The thin film material can be silica, silicon, or a few other suitable/equivalent materials. Thus, a unique advantage of an embodiment of the present disclosure is that, because the thin film can be applied to substrates made of a large number of different materials, only common etching recipes need to be developed for a few thin film materials. In contrast, existing methods of etching structures directly on a substrate would require a different etching recipe for each substrate made of a different material.

As shown in FIG. 1, after applying the thin film 120 to the surface of the substrate 110, the coated substrate is placed between two electrodes 140, 150 of an etching system 160. In one embodiment, the etching system is a reactive ion etching (ME) system, an inductively coupled plasma reactive ion etching (ICP-RIE) system or an ion beam sputtering system. Gases 170 are introduced into the reactive ion etching chamber 160 that contains the electrodes 140, 150. A radio frequency wave 180 is applied to the electrodes 140, 150 to ionize the gases 170 and create a plasma 190 between the electrodes 140, 150. The plasma 190 chemically and physically etches the exposed thin film material and simultaneously deposits nanoscale polymer islands on the thin film surface.

In one embodiment, the gases include a mixture of gases selected from Argon, Helium, $H_2$, $O_2$, CH4, $CHF_3$, $CF_4$, $C_4F_8$, $SF_6$, $Cl_2$, $F_2$, $BCl_3$, and $SiCl_4$.

Note that the plasma does not chemically etch the deposited polymer, which prevents the removal of topcoat material that is covered under the polymer. The energetic ions driven by the potential difference between the electrodes physically remove the thin film and polymer materials, and the deposition and physical removal of the polymer concurrently occur on the thin film surface.

The chemical and physical etching continues for a length of time to produce textured structures that are distributed on the thin film surface, and the structures produced have varied sizes, heights, and spacings. The length of time is based on the rate of thin film removal and rate of polymer deposition, and dimensions of the desired structure.

In one embodiment, the textured structures reduce the reflection of incident light through the thin film to less than or equal to 0.25%, and the textured structures reduce the reflection of incident light through the substrate surface to less than or equal to $$0.25\% + \left(\frac{n_s - n_t}{n_s + n_t}\right)^2,$$

where $n_s$ and $n_t$ are the refractive indices of the substrate and thin film respectively.

Figure 3A:
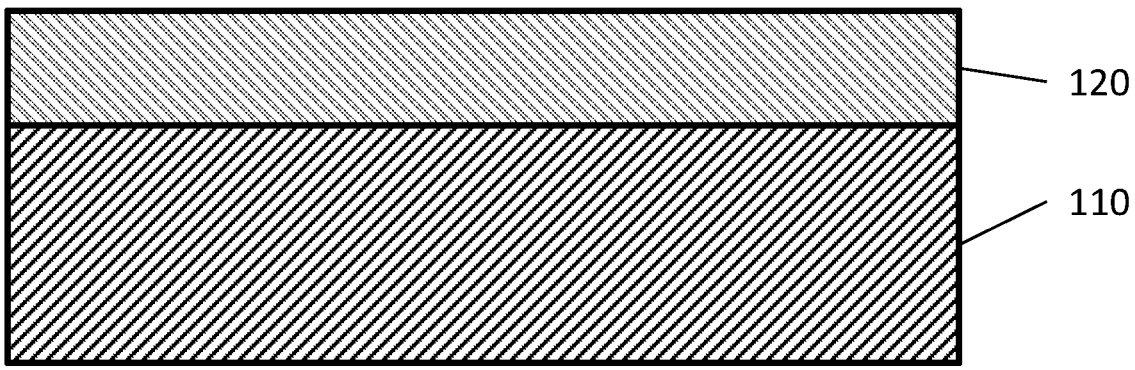
FIG. 3A illustrates a thin film deposited on a substrate.
Figure 3B:
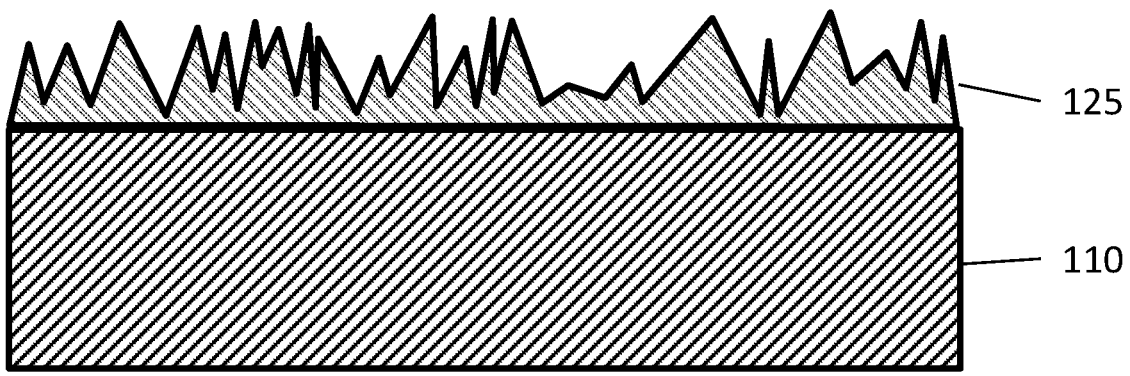
FIG. 3B illustrates the texture created in the thin film.
Figure 3C:
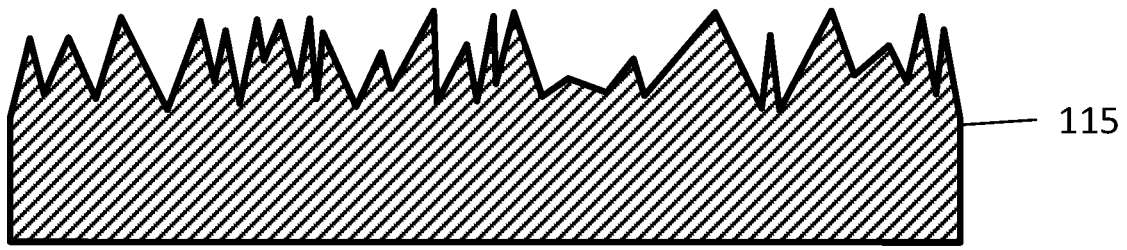
FIG. 3C illustrates the texture transferred to the substrate according to one embodiment of the present disclosure.

In another embodiment of the present disclosure, the thin film is used as a sacrificial layer. As shown in FIG. 3A, a thin film 120 is applied onto the substrate 110 in the initial state. FIG. 3B shows the intermediate state with textured structures 125 on the sacrificial thin film. FIG. 3C shows the final state where the textured structure 115 is transferred to the substrate.

Referring to FIG. 1 again, the first part of the process is similar to the embodiment shown in FIG. 2. After applying the thin film 120 to the surface of the substrate 110, the substrate is placed between two electrodes 140, 150 of a reactive ion etching system 160. Gases 170 are introduced into the reactive ion etching chamber 160 that contains the electrodes 140, 150. A radio frequency wave 180 is applied to the electrodes 140, 150 to ionize the gases and create a plasma 190 between the electrodes. The plasma chemically and physically etches the exposed thin film material and simultaneously deposits nanoscale polymer islands on the thin film surface.

Upon arriving to the intermediate state shown in FIG. 3B, one or more gases 175 are injected into the etching chamber 160. One or more radio frequency waves 185 are applied to the electrodes 140, 150 of the etching chamber 160 to ionize the gases 175 and create a high-density plasma 195 between the electrodes 140, 150. In one embodiment, the etching system is a reactive ion etching (RIE) system, an inductively coupled plasma reactive ion etching (ICP-RIE) system or an ion beam sputtering system. In one embodiment, FIG. 1 shows the same etching system is used for manufacturing both the intermediate state and the final state. It is contemplated that the etching system used for manufacturing the intermediate state may be different from the etching system used for manufacturing the final state in another embodiment. The high-density plasma 195 removes the thin film and substrate materials concurrently. Note that the textured thin film structures 125 shield the substrate material underneath during the etching until an area of the thin film material is removed and the exposed substrate material is then removed. The locations of the substrate material being exposed follows the removal of the material of the textured structures of the thin film, and thus the profile of the substrate being etched follows the profile of the textured structures of the thin film. Thus, the textured structures of the thin film act as a mask for the substrate during the etching. The etching continues for a length of time to transfer the textured structures from the thin film to the substrate. The resulted substrate having a textured surface 115 is shown in FIG. 3C. Note that the textured structures of the substrate may be made more pronounced or obscured relative to the textured structures of the thin film by adjusting the ratio between the etch rate of the substrate material to the etch rate of the thin film material.

In one embodiment, the textured structures in the substrate reduce the reflection of incident light through the substrate to 0.02 or smaller. In one embodiment, the etching may be a reactive ion etching. In one embodiment an inductively coupled plasma reactive ion etching. In one embodiment, the etching may be an ion beam sputtering.

In view of the foregoing, one or more embodiments of the present disclosure satisfies the long-felt need for a robust process to manufacture stable AR coatings with wide wavelength bands capable of withstanding high optical power, with low angular sensitivity, and weak polarization dependence. It also provides a unique advantage that the process is relatively independent of material or wavelength and capable of easily fabricating structures for different substrates.

While the present disclosure describes at some length and with some particularity with respect to the several described embodiments, it is not intended that it should be limited to any such particulars or embodiments or any particular embodiment, but it is to be construed so as to provide the broadest possible interpretation in view of the related art and, therefore, to effectively encompass various embodiments herein. Furthermore, the foregoing describes various embodiments foreseen by the inventor for which an enabling description was available, notwithstanding that modifications of the disclosure, not presently foreseen, may nonetheless represent equivalents thereto.

The invention claimed is:

1. A method of producing an anti-reflective textured surface of an additive thin film deposited onto a substrate to increase transmission of light through the substrate, the method comprising:

applying a thin film to a surface of the substrate;

placing the substrate between a first electrode and a second electrode of an etching chamber;

injecting a mixture of gases into the etching chamber;

applying a radio frequency wave to the electrodes to ionize the mixture of gases and create a plasma between the electrodes, such that reactive ions and non-reactive polymer molecules are created in the plasma;

wherein the plasma chemically and physically etches away material of the exposed thin film and simultaneously deposits nanoscale non-reactive polymer islands on an exposed surface of the thin film;

wherein the deposited nanoscale non-reactive polymer islands resist chemical reactions, with the reactive ions and/or reactive neutral species in the plasma, of material of the exposed thin film, which prevents the removal of material of the exposed thin film that is covered under the deposited nanoscale non-reactive polymer islands;

wherein energetic ions driven by the radio frequency wave on the electrodes physically remove the thin film and the deposited nanoscale non-reactive polymer islands;

wherein the depositing of the nanoscale non-reactive polymer islands and the physically removing of the nanoscale non-reactive polymer islands concurrently occur on the exposed surface of the thin film at a same time as the chemical and physical etching of the material of the exposed thin film; and wherein the chemical and physical etching continues for a length of time to produce textured structures that are distributed on the thin film surface, and the structures have varied sizes, heights, and spacings.

2. The method of claim 1, wherein the textured structures reduce reflection of incident light through the thin film to less than or equal to 0.25%.

3. The method of claim 1, wherein the etching is an inductively coupled plasma reactive ion etching.

4. The method of claim 1, wherein the etching is an is an ion beam sputtering.

5. The method of claim 1, wherein the mixture of gases comprise one or more gases selected from Argon, Helium, $H_2$, $O_2$, $CH_4$, $CHF_3$, $CF_4$, $C_4F_8$, $SF_6$, $Cl_2$, $F_2$, $BCl_3$, and $SiCl_4$.

6. The method of claim 1, wherein the substrate comprises at least one of: borosilicate glass, barium borate, barium fluoride calcite, sapphire, calcium fluoride, diamond, indium fluoride, magnesium fluoride, potassium bromide, zinc selenide, germanium, polytetrafluoroethylene, rutile, yttrium orthovanadate, zirconium fluoride.

7. The method of claim 1, wherein the thin film material is silica or silicon, and
wherein the thickness of the thin film is selected based on a desired height of the textured structures.

8. The method of claim 1, wherein the gas flow, chamber pressure, length of time and radio frequency wave power of etching are selected to produce a desired size, height, and density of the textured structures.

9. The method of claim 1, wherein the textured structures reduce a reflection of incident light through the substrate surface to less than or equal to $$0.25\% + \left(\frac{n_s - n_t}{n_s + n_t}\right)^2,$$

where $n_s$ and $n_t$ are the refractive indices of substrate and thin film respectively.

10. The method of claim 1, wherein only the deposited nanoscale non-reactive polymer islands are used as nanomasks for etching the substrate.

11. A method of producing an anti-reflective textured surface of a substrate using a sacrificial thin film to increase transmission of light through the substrate, the method comprising:
applying a thin film to a surface of the substrate;
placing the substrate between a first electrode and a second electrode of an etching chamber;
injecting a first mixture of gases into the etching chamber;
applying a first radio frequency wave to the electrodes to ionize the first mixture of gases and create a first plasma between the electrodes, such that reactive ions and non-reactive polymer molecules are created in the first plasma;
wherein the first plasma chemically and physically etches away material of the exposed thin film and simultaneously deposits nanoscale non-reactive polymer islands on an exposed surface of the thin film;
wherein the deposited nanoscale non-reactive polymer islands is configured to resist chemical reactions, with the reactive ions and/or reactive neutral species in the first plasma, of material of the exposed thin film, which prevents the removal of material that is covered under the deposited nanoscale non-reactive polymer islands;
wherein energetic ions driven by the first radio frequency wave on the electrodes physically remove the thin film and the deposited nanoscale non-reactive polymer islands;
wherein the depositing of the nanoscale non-reactive polymer islands and the physically removing of the deposited nanoscale non-reactive polymer islands concurrently occur at locations on the exposed surface of the thin film;
wherein the chemical and physical etching continues for a first length of time to produce textured structures that are distributed on the exposed surface of the thin film, and the structures have varied sizes, heights, and spacings;
the method further comprising:
injecting a second mixture of gases into the etching chamber; and
applying a second radio frequency wave to the electrodes to ionize the second mixture of gases and create a second plasma between the electrodes;
wherein the second plasma removes the thin film and substrate materials concurrently;
wherein the structures made in the thin film material serve as masks for etching the substrate material; and
wherein the etching continues for a second length of time to transfer the textured structures from the thin film to the substrate.

12. The method of claim 11, wherein the textured structures on the substrate reduce reflection of incident light through the substrate to 0.02 or smaller.

13. The method of claim 11, wherein the etching is an inductively coupled plasma reactive ion etching.

14. The method of claim 11, wherein the etching is an ion beam sputtering.

15. The method of claim 11, wherein the first mixture of gases comprise one or more gases selected from Argon, Helium, $H_2$, $O_2$, $CH_4$, $CHF_3$, $CF_4$, $C_4F_8$, $SF_6$, $Cl_2$, $F_2$, $BCl_3$, and $SiCl_4$, and the second mixture of gases comprise one or more gases selected from Argon, Helium, $H_2$, $O_2$, $CH_4$, $CHF_3$, $CF_4$, $C_4F_8$, $SF_6$, $Cl_2$, $F_2$, $BCl_3$, and SiCl.

16. The method of claim 11, wherein the substrate comprises at least one of: borosilicate glass, barium borate, barium fluoride calcite, sapphire, calcium fluoride, diamond, indium fluoride, magnesium fluoride, potassium bromide, zinc selenide, germanium, polytetrafluoroethylene, rutile, yttrium orthovanadate, zirconium fluoride.

17. The method of claim 11, wherein the thin film material is silica or silicon.

18. The method of claim 11, wherein the thickness of the thin film is selected based on a desired height of the textured structures.

19. The method of claim 11, wherein the gas flow, chamber pressure, first and second lengths time, second time and first and second radio frequency wave powers of etching are selected to produce a desired size, height, and density of the textured structures.

20. The method of claim 11, wherein a ratio of the etch rate of the thin film material to the etch rate of the substrate material is selected to produce a desired size, height, and density of the textured structures.

* * * * *